(12) United States Patent
Salsich et al.

(10) Patent No.: US 11,160,144 B2
(45) Date of Patent: Oct. 26, 2021

(54) MODULAR TRANSFORMERS AND INDUCTION HEATING SYSTEMS HAVING MODULAR TRANSFORMERS

(71) Applicant: ILLINOIS TOOL WORKS INC., Glenview, IL (US)

(72) Inventors: Anthony V. Salsich, Appleton, WI (US); Paul Verhagen, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 360 days.

(21) Appl. No.: 16/198,252

(22) Filed: Nov. 21, 2018

(65) Prior Publication Data

US 2020/0163168 A1 May 21, 2020

(51) Int. Cl.
| H05B 6/04 | (2006.01) |
| H05B 6/44 | (2006.01) |
| H02J 50/80 | (2016.01) |
| H05B 6/36 | (2006.01) |

(52) U.S. Cl.
CPC ............... *H05B 6/04* (2013.01); *H05B 6/365* (2013.01); *H05B 6/44* (2013.01)

(58) Field of Classification Search
CPC ............ G08B 21/0225; G08B 21/0227; G08B 25/016; H01F 38/14; H02J 50/10; H02J 50/80; H05B 6/04; H05B 6/06; H05B 6/14; H05B 6/365; H05B 6/44
USPC ....... 219/662, 660, 661, 676, 671, 670, 650, 219/632, 625, 602, 633–636, 600, 659; 363/71, 97, 160, 161
See application file for complete search history.

(56) References Cited

U.S. PATENT DOCUMENTS

| 5,379,021 A | 1/1995 | Ito et al. |
| 5,600,222 A | 2/1997 | Hall et al. |
| 5,606,237 A | 2/1997 | Biasotti et al. |
| 5,703,462 A | 12/1997 | Woody et al. |

(Continued)

FOREIGN PATENT DOCUMENTS

JP 2002010535 1/2002

OTHER PUBLICATIONS

European Patent Office; "Extended European Search Report," issued in connection with European patent application No. 1920636.6, dated Apr. 14, 2020, 9 pages.

*Primary Examiner* — Quang T Van
(74) *Attorney, Agent, or Firm* — McAndrews, Held & Malloy, Ltd.

(57) ABSTRACT

In some examples, an induction heating system includes an induction heating power supply and an induction heating tool configured to receive induction heating type power from the induction power supply through a modular transformer. In some examples, the modular transformer comprises a first coupler (e.g., a power receptacle) and a second coupler (e.g., a power insert) configured to couple together to complete the modular transformer, and/or decouple to separate the modular transformer. In some examples, the first coupler is in electrical communication with the induction heating power supply, and the second coupler is in electrical communication with the induction heating tool. When the first and second couplers are coupled together to complete the modular transformer, induction heating power flows through the modular transformer from the induction heating power supply to the induction heating tool.

20 Claims, 5 Drawing Sheets

(56) References Cited

U.S. PATENT DOCUMENTS

| | | |
|---|---|---|
| 6,476,520 B1 | 11/2002 | Boehm et al. |
| 9,913,320 B2 | 3/2018 | Garvey et al. |
| 2005/0092738 A1 | 5/2005 | Ring |
| 2012/0248093 A1* | 10/2012 | Ulrich .................. H05B 6/14 |
| | | 219/600 |
| 2015/0334782 A1 | 11/2015 | Garvey et al. |
| 2017/0054195 A1 | 2/2017 | Bokenfohr et al. |

* cited by examiner

MODULAR TRANSFORMERS AND INDUCTION HEATING SYSTEMS HAVING MODULAR TRANSFORMERS

TECHNICAL FIELD

The present disclosure generally relates to induction heating systems and, more particularly, to modular transformers and induction heating systems having modular transformers.

BACKGROUND

Induction heating refers to a method for producing heat in a localized area on a susceptible (typically metal) object. Induction heating involves applying an alternating current (AC) electric signal to a heating loop placed near a specific location on and/or near a piece of metal to be heated. The varying current in the loop creates a varying magnetic flux within the metal to be heated. Current is induced in the metal by the magnetic flux and the internal resistance of the metal causes it to heat up in a relatively short period of time.

Induction heating may be used for many different purposes including curing adhesives, hardening of metals, brazing, soldering, and other fabrication processes in which heat is a necessary or desirable agent. Induction heating may also be used in conjunction with welding systems, such as, for example, for heating materials before, during, and/or after welding.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to apparatus, systems, and methods for induction heating, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
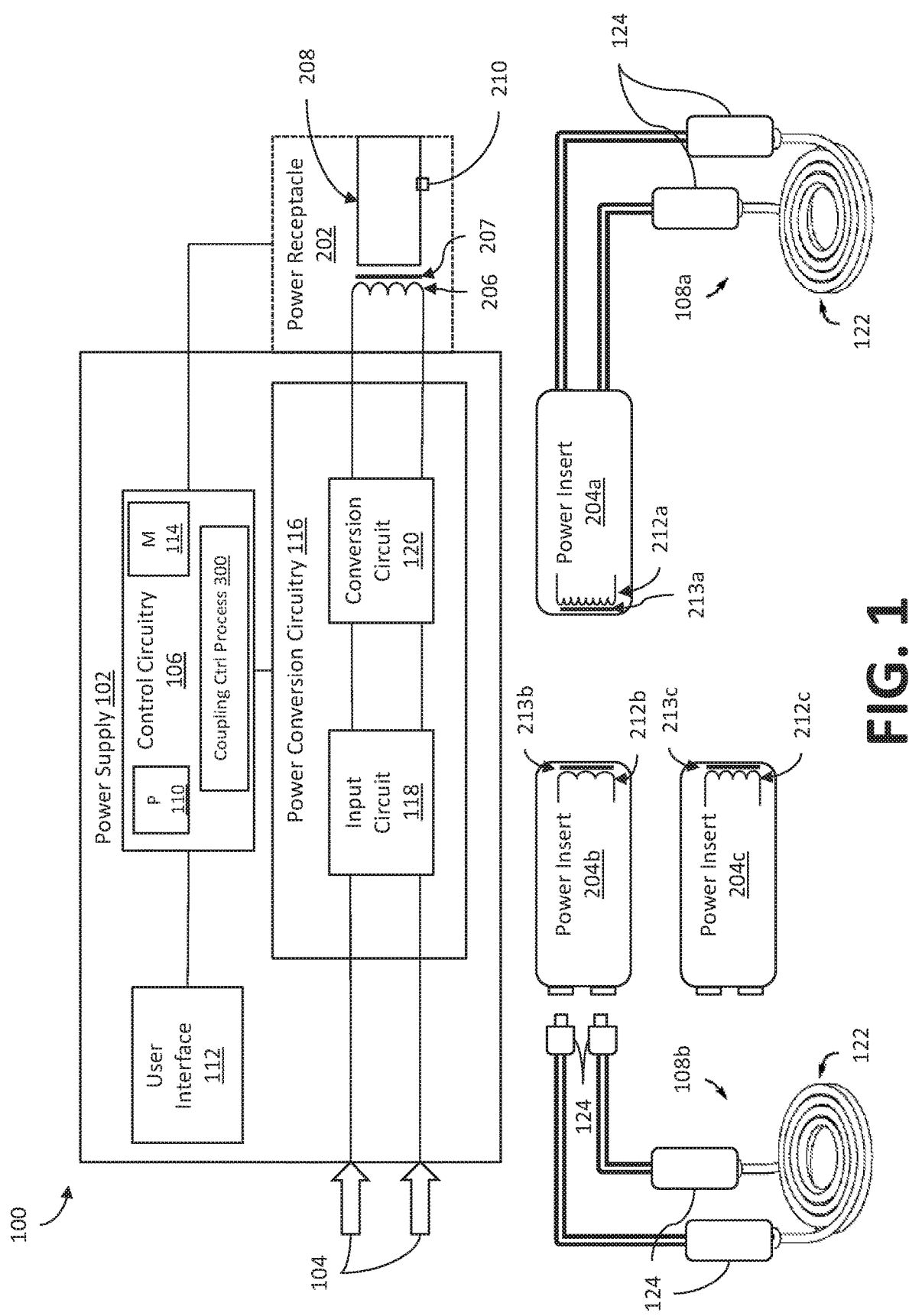
FIG. 1 is a block diagram of an example induction heating system, in accordance with aspects of this disclosure.

The figures are not necessarily to scale. Where appropriate, the same or similar reference numerals are used in the figures to refer to similar or identical elements. For example, reference numerals utilizing lettering (e.g., induction heating tool 108a, induction heating tool 108b) refer to instances of the same reference numeral that does not have the lettering (e.g., induction heating tool(s) 108).

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein the terms "circuits" and "circuitry" refer to physical electronic or electrical components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As utilized herein, the terms "e.g.," and "for example" set off lists of one or more non-limiting examples, instances, or illustrations.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, welding-type power refers to power suitable for welding, cladding, plasma cutting, induction heating, CAC-A and/or hot wire welding/preheating (including laser welding and laser cladding), carbon arc cutting or gouging, and/or resistive preheating.

As used herein, an induction heating system includes a power source that can provide power for induction heating, such as, for example, via an induction heating tool that can induce heat in a workpiece.

As used herein, an induction heating power supply refers to a power supply that is capable of providing induction-type power to an induction heating tool, induction heating element, induction heating coil, and/or induction heating head, to induce current flow and/or heat in a (typically metallic) workpiece.

As used herein, induction-type power refers to power suitable for an induction heating tool, induction heating element, induction heating coil, and/or induction heating head, to induce current flow and/or heat in a (typically metallic) workpiece.

As used herein, an induction heating tool refers to an inductive load such as an induction heating coil, an induction heating winding, and/or an induction heating coil, which heats a workpiece by induction.

As used herein, a winding refers to conductor that induces a magnetic field when current flows therein.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

Some examples of the present disclosure relate to an induction heating system, comprising a first power coupler comprising a first magnetic core, the first power coupler configured for electrical communication with an induction heating power supply, and a second power coupler comprising a second magnetic core, the second power coupler configured for electrical communication with an induction heating tool, where the first power coupler and second power coupler are configured to magnetically couple the first magnetic core and the second magnetic core to form a transformer through which the induction heating power is transferred to the induction heating tool.

In some examples, the first power coupler is configured for releasable attachment to the induction heating power supply. In some examples, the second power coupler is configured for releasable attachment to the induction heating tool. In some examples, the first power coupler further comprises a first winding wound around the first magnetic core and the second power coupler further comprises a second winding wound around the second magnetic core. In some examples, the first winding is hermetically sealed within a first housing that retains the first magnetic core, the second winding is hermetically sealed within a second housing that retains the second magnetic core, and the first and second housings are configured to align the first core with the second core when the first and second power couplers are connected together. In some examples, the first power coupler and the second power coupler are further configured to disconnect to decouple the magnetic coupling between the first magnetic core and the second magnetic core. In some examples, the induction heating power supply is configured to disable when the first power coupler and second power coupler are decoupled. In some examples, the system further comprises control circuitry configured to detect when the first power coupler and second power coupler are decoupled, and the control circuitry is configured to disable the induction heating power supply in response to the detection.

Some examples of the present disclosure relate to a method of impedance matching an induction heating power supply, comprising decoupling a first power coupler in electrical communication with an induction heating power supply from a second power coupler in electrical communication with an induction heating tool, the first power coupler comprising a first magnetic core and the second power coupler comprising a second magnetic core, where the first power coupler and second power coupler are configured to magnetically couple the first magnetic core and the second magnetic core to form a transformer through which induction heating power is transferred from the induction power supply to the induction heating tool. The method further comprises coupling the first power coupler to a third power coupler in electrical communication with the induction heating tool or an alternate induction heating tool, the third power coupler comprising a third magnetic core, where the first power coupler and third power coupler are configured to magnetically couple the first magnetic core and the third magnetic core to form a transformer through which the induction heating power is transferred to the induction heating tool or the alternate induction heating tool.

In some examples, the first power coupler further comprises a first winding wound around the first magnetic core, the second power coupler further comprises a second winding wound around the second magnetic core, and the third power coupler further comprises a third winding wound around the third magnetic core. In some examples, the second winding is different than the third winding. In some examples, the second winding comprises a second conductor having a second number of turns and the third winding comprises a third conductor having a third number of turns, where the second number of turns is different than the third number of turns. In some examples, the first winding is hermetically sealed within a first housing that retains the first magnetic core, the second winding is hermetically sealed within a second housing that retains the second magnetic core, the third winding is hermetically sealed within a third housing that retains the third magnetic core, the first and second housings are configured to align the first core with the second core when the first and second power couplers are connected together, and the first and third housings are configured to align the first core with the third core when the first and third power couplers are connected together. In some examples, the method further comprises disabling the induction heating power supply in response to detecting the decoupling of the first power coupler from the second power coupler, and enabling the induction heating power supply in response to detecting the coupling of the first power coupler to the third power.

Some examples of the present disclosure relate to an induction heating power supply, comprising power conversion circuitry configured to receive input power from a power source and convert the input power to induction heating power, and a first power coupler in electrical communication with the power conversion circuitry, the first power coupler comprising a first magnetic core and configured to couple to a second power coupler comprising a second magnetic core, the second power coupler being in electrical communication with an induction heating tool, where the first power coupler and second power coupler are configured to magnetically couple the first magnetic core and the second magnetic core to form a transformer through which the induction heating power is transferred to the induction heating tool.

In some examples, the first power coupler is releasably attached to the induction heating power supply. In some examples, the first power coupler further comprises a first winding wound around the first magnetic core, wherein the first winding is hermetically sealed within a first housing that retains the first magnetic core. In some examples, the first power coupler comprises a power receptacle having an opening configured to receive the second power coupler. In some examples, the first power coupler comprises an insert configured to fit within a receptacle opening of the second power coupler. In some examples, the system further comprises control circuitry configured to disable the power conversion circuitry in response to a signal representative of decoupled first and second power couplers.

Some examples of the present disclosure relate to induction heating systems. In some examples, an induction heating system includes an induction heating power supply and an induction heating tool coupled together through a modular transformer. In some examples, the modular transformer comprises a first coupler (e.g., a power receptacle) and a second coupler (e.g., a power insert) configured to couple together to complete the modular transformer, and/or decouple to separate the modular transformer. In some examples, the first coupler is in electrical communication with the induction heating power supply, and the second coupler is in electrical communication with the induction heating tool. When the first and second couplers are coupled together to complete the modular transformer, induction-type power flows through the modular transformer from the induction heating power supply to the induction heating tool.

Induction heating systems use impedance matching to match the impedance of an induction heating power supply to the impedance of an induction heating tool. Impedance matching increases the efficiency of power transfer from the induction heating power supply to the induction heating tool. One particular strategy for impedance matching is through step up and/or step down transformers.

Conventionally, induction heating systems used one or more hardwired transformers to step up or step down an output voltage, depending on the configuration, needs, and/or impedance of the induction heating tool and/or system. The ratio of the number of primary windings compared to (and/or in proportion to) the number of secondary windings determines the extent to which voltage is stepped up or stepped down. Since conventional induction heating systems use hardwired transformers, an operator must directly access and manipulate exposed conductor wire windings of the transformer in order to manipulate the ratio of primary windings to secondary windings.

Advantageously, the modular transformer contemplated by the present disclosure allows an operator to manipulate the ratio of primary windings to secondary windings without having to directly access and/or manipulate the exposed wire windings of the transformer. In particular, the first coupler comprises a primary set of windings of the modular transformer hermetically sealed within a first housing. The second coupler comprises a secondary set of windings of the modular transformer hermetically sealed within a second housing. If the ratio of primary windings to secondary windings is less than ideal for impedance matching and/or the desired step up/down voltage, an operator can use a different (e.g., third) coupler, with a different number (and/or configuration) of primary/secondary windings, and use that coupler as the first or second coupler of the modular transformer, all without having to directly manipulate any exposed wire windings. In some examples, the induction heating system of the present disclosure may be provided with a plurality of first and/or second couplers, with different windings and/or configurations, that may be swapped in and/or out of the system to allow an operator to manipulate the primary to secondary windings ratio without having to directly access the exposed electrical wires of the transformer.

FIG. 1 shows an example induction heating system 100, according aspects of the present disclosure. In the example of FIG. 1, the induction heating system 100 includes an induction heating power supply 102 and induction heating tools 108 configured to be powered by the power supply 102. As shown, the induction heating power supply 102 receives input power from a power source 104. The power source 104 is indicated in FIG. 1 by arrows 104. In some examples, the power source 104 may be a generator, battery, main electrical power source, welding-type power supply, etc. In some examples, the power source 104 may provide three phase power to the power supply 102. In the example of FIG. 1, the induction heating power supply 102 is configured to generate AC induction-type power (and/or welding-type power) from the power supplied via the power source 104.

As illustrated in the example of FIG. 1, the induction heating power supply 102 includes a user interface 112. In some examples, the user interface 112 may be a remote interface that communicates with the induction heating power supply 102 via a wireless communication channel or a wired cable connection. In some examples, the user interface 112 may include input mechanisms, such as buttons, knobs, dials, touch screens, microphones, mice, keyboards, and so forth to allow an operator to regulate various operating parameters of the induction heating power supply 102. For example, the user interface 112 may enable an operator to select a particular operation and/or configuration of the induction heating power supply 102, such as a frequency and/or amplitude of the alternating current produced by the induction heating power supply 102, for example. Similarly, the user interface 112 may enable an operator to select a desired output temperature of an induction heating tool 108 coupled to the induction heating power supply 102. The user interface 112 may also include one or more output mechanisms (e.g., display screens and/or audio speakers) configured to provide system feedback to the operator (e.g., temperature and/or travel speed of the induction heating tool 108, etc.). In some examples, the user interface 112 may be configured to provide a warning (and/or alert, alarm, feedback, etc.) via the output mechanisms. The warning may be a visual, audio, and/or other type of warning, such as an emphasized visual indication shown on the display screen of the user interface, and/or a klaxon, siren, and/or other sound that may be associated with a warning.

In the example of FIG. 1, the induction heating power supply 102 includes control circuitry 106. As shown, the control circuitry 106 comprises one or more processors 110 and memory circuitry 114. In the example of FIG. 1, the control circuitry 106 further includes instructions and/or circuitry to implement a coupling control process 300, which will be discussed further below. As shown, the control circuitry 106 is in electrical communication with the user interface 112 and power conversion circuitry 116, further discussed below. The control circuitry 106 is further in electrical communication with a power receptacle 202, further discussed below.

In the example of FIG. 1, the control circuitry 106 is configured to supply control signals to the power conversion circuitry 116 to control generation of the induction-type power from the input power provided by the power source 104. For example, the control circuitry 106 may provide one or more control signals to the power conversion circuitry 116 representative of one or more parameters (e.g., AC frequency and/or amplitude) of the induction-type power generated by the power conversion circuitry 116, and/or a target and/or change in one or more parameters. In such an example, the power conversion circuitry 116 may operate and/or adjust its operation according to the control signal(s).

In some examples, the control circuitry 106 may use input provided via the user interface 112 and/or feedback from the power conversion circuitry 116 and/or power receptacle 202 when determining the appropriate control signals. For example, the user interface 112 may communicate an operator selection to the control circuitry 106, which may process the selection (e.g., via processor 110) and/or retrieve the particular configuration parameters associated with the selection stored in the memory circuitry 114. Thereafter, the control circuitry 106 may send one or more control signals representative of the configuration parameters (and/or configured to produce induction-type power with the configuration parameters) to the power conversion circuitry 116.

In some examples, the control circuitry 106 is configured to detect characteristics (e.g., voltage, current, resonance, etc.) of the induction-type power provided by the power conversion circuitry 116, such as via one or more feedback signals, for example. In some examples, the control circuitry 106 may determine whether the power receptacle 202 is coupled to a power insert 204 based on the one or more feedback signals. For example, the control circuitry 106 may receive feedback signals indicating a relatively continuous and/or constant (e.g., within a certain threshold range and/or deviation) power and/or resonance in the power conversion circuitry 116. In some examples, the control circuitry 106 may determine that a relatively continuous and/or constant power and/or resonance indicates that no (and/or negligible) power is being transferred to the power insert 204 and/or induction heating tool(s) 108. Thereby, the control circuitry 106 may determine the power receptacle 202 is not coupled to a power insert 204. As an alternative example, the control circuitry 106 may receive feedback signals indicating a relatively discontinuous and/or changing (e.g., outside of the threshold range and/or deviation) power and/or resonance in the power conversion circuitry 116. From this, the control circuitry 106 may determine substantial (and/or non-negligible) power is being transferred to the power insert 204 and/or induction heating tool(s) 108, and thus determine the power receptacle 202 is coupled to a power insert 204.

In some examples, the control circuitry 106 may control the power conversion circuitry 116 based on whether the power receptacle 202 is coupled to a power insert 204. For example, the control circuitry 106 may send one or more control signals to the power conversion circuitry 116 representative of one or more commands to reduce a level, amplitude, and/or amount of induction-type power generated by the power conversion circuitry 116 when the power receptacle 202 is not coupled to a power insert 204. As another example, the control circuitry 106 may send one or more control signals to the power conversion circuitry 116 representative of one or more commands to disable the power conversion circuitry 116 when the power receptacle 202 is not coupled to a power insert 204. For example, the control circuitry 106 may send one or more control signals to the power conversion circuitry 116 representative of one or more commands to cease generating induction-type power, cease converting power, and/or cease adding electrical power to the electrical bus. Alternatively, or additionally, the control circuitry 106 may send one or more control signals to the power conversion circuitry 116 representative of one or more commands to increase and/or decrease an amount (and/or magnitude) of induction-type power generated by the power conversion circuitry 116 (and/or enable the power conversion circuitry 116) when the power receptacle 202 is coupled to a power insert 204.

In the example of FIG. 1, the power conversion circuitry 116 includes an input circuit 118, and a conversion circuit 120. As shown, the input circuit 118 of the power conversion circuitry 116 receives input power from the power source 104. The input circuit 118 is configured to perform preliminary (e.g., pre-regulating) operations upon the input power, so as to condition the input power for the conversion circuit 120. In some examples, the input circuit 118 is configured to provide the conversion circuit 120 with pre-regulated power on an electrical bus through which the input circuit 118 and conversion circuit 120 are in electrical communication. For example, the input circuit 118 may provide direct current (DC) power on the bus. In some examples, the input circuit 118 may comprise one or more rectifiers and/or one or more pre-regulator circuits (e.g., one or more boost converters, stacked boost converters, buck converters, boost-buck converters, and/or other circuits).

In some examples, operation of the input circuit 118 is regulated and/or controlled by the control circuitry 106 via one or more control signals. For example, the input circuit 118 may be configured to adjust a voltage level of the pre-regulated power output by the input circuit 118 by changing characteristics (e.g., activate/deactivate, open/close, turn off/on, etc.) of one or more controllable circuit elements (e.g., transistors, relays, switches, etc.) of the input circuit 118. In such an example, the control circuitry 106 may adjust the characteristics (e.g., frequency, duty cycle, etc.) of the one or more control signals to control and/or regulate the operation of the input circuit 118 via the one or more controllable circuit elements of the input circuit 118.

In the example of FIG. 1, the conversion circuit 120 is configured to convert the pre-regulated power provided by the input circuit 118 to the induction-type power used by induction heating tool(s) 108. In some examples, the conversion circuit 120 comprises an inverter circuit configured to generate AC power from DC power provided by the input circuit 118. In some examples, operation of the conversion circuit 120 is regulated and/or controlled by the control circuitry 106 via one or more control signals. For example, the control circuitry 106 may regulate and/or control one or more characteristics (e.g., frequency, amplitude) of the induction-type power provided by the conversion circuit 120, such as in response to input via the user interface 112, for example. In some examples, the control circuitry 106 may adjust the characteristics (e.g., frequency, duty cycle, etc.) of the one or more control signals to control and/or regulate the operation of the conversion circuit 120 via one or more controllable circuit elements of the conversion circuit 120.

In the example of FIG. 1, the conversion circuit 120 is in electrical communication with the power receptacle 202. The conversion circuit 120 provides the induction-type power to the power receptacle 202 via the electrical communication channel (e.g., via an electrical bus). In some examples, the power receptacle 202 comprises one portion of a modular transformer 200 through which induction-type power is transferred from the induction heating power supply 102 to the induction heating tool(s) 108.

In the example of FIG. 1, the power receptacle 202 is part of the induction heating power supply 102. In some examples, the power receptacle 202 may be separable from, and/or separate from, the induction heating power supply 102. In some examples, the power receptacle 202 may be implemented in a junction box (not shown) of the induction heating system 100. In some examples, a power insert 204 may be part of the induction heating power supply 102, rather than a power receptacle 202.

As shown, the power receptacle 202 is in electrical communication with the power conversion circuitry 116, from which the power receptacle receives induction-type power. In the example of FIG. 1, the power receptacle 202 comprises a first portion of a modular transformer 200. In particular, the power receptacle 202 comprises a primary winding 206 of the modular transformer 200, and a primary core 207 of the transformer core, as discussed further below. The primary winding 206 comprises one or more conductors wound around the primary core 207 of the power receptacle 202. The primary winding 206 may be hermetically sealed within a housing of the power receptacle 202, such that the conductors of the primary winding 206 are not exposed.

In some examples, the primary winding 206 may comprise one or more fluid cooled conductors, such as, for example, a hollow conductor (e.g., copper, aluminum, etc.) cooled by fluid routed through the hollow interior of the conductor, or a conductor within hollow tubing cooled by fluid routed over the conductor within the hollow tubing. In some examples, a cooling system (not shown) may connect to the primary winding 206 to introduce and/or remove cooling fluid. In some examples, such cooling may assist in mitigating heat produced by electrical current flowing through the primary winding 206.

As shown, the power receptacle 202 also includes an opening 208 sized and/or configured to receive a power insert 204 comprising a second portion of the modular transformer 200, as further discussed below. In the example of FIG. 1, a connection detection switch 210 protrudes into the opening. As shown, the connection detection switch 210 is a movable mechanical switch that is actuated when the power insert 204 is coupled to the power receptacle 202 via insertion into the opening 208. In some examples, the connection detection switch 210 may be an electrical switch, jumper, resistor, circuit, or some other signal generating connection detector. In some examples, actuation of the connection detection switch 210 completes or breaks a connection detection circuit (not shown), or a portion of a connection detection circuit. In some examples, the connection detection circuit (or some other circuit) is configured to send a connection signal to the control circuitry 106 representative of the connection status of the power receptacle 202 and/or power insert 204 in view of the connection detection circuit and/or connection detection switch 210. In some examples, actuation of the connection detection switch 210 may otherwise indicate to the control circuitry 106 the connection status of the power receptacle 202 and/or power insert 204.

In the example of FIG. 1, there are shown three power inserts 204a, 204b, 204c and two induction heating tools 108a, 108b. While shown as being similar in FIG. 1, in some examples, the induction heating tools 108 may be entirely different. As shown, both induction heating tools 108 include an induction heating coil 122 configured in a stacked and/or pancake spiral pattern. In some examples, the induction heating coil 122 may be arranged in some other configuration and/or pattern, such as to fit a particular workpiece and/or weld joint configuration, for example. In some examples, the induction heating coil 122 may be implemented using a fixture for repeatable heating of a consistent type of joint. In some examples, the induction coil 122 may comprise a Litz wire (e.g., a jacketed Litz wire). In some examples, the induction coil heating coil 122 may be secured onto and/or into an insulating material (e.g., sewn into an insulating blanket). In some examples, the induction heating tool 108 may be moved by a robotic positioning system in tandem along a welding path together with a conventional welding head, for example a TIG head or any other known type, which "follows" the pre-heating head.

In the example of FIG. 1, the induction heating tools 108 and/or induction heating coils 122 are configured to receive induction-type power from the induction heating power supply 102 via a power insert 204. In some examples, the induction heating tools 108 may further be configured to receive coolant from the induction heating power supply 102 and/or some other source. As shown, the induction heating tools 108 include adapters 124 configured to allow the induction coils 122 to electrically connect to the power inserts 204. The adapters 124 connect with conventional plugs of the induction tools 108 on one end, and are configured for electrical connection to the power inserts 204 on the other end. The adapters 124 allow for conventional induction heating tools 108 to be used with the power inserts 204. In some examples, the adapters 124 may be omitted, such as for more recent versions of the induction heating tool(s) 108.

In the example of FIG. 1, the induction heating coils 122 of the induction heating tool 108a are in electrical communication with power insert 204a, via a fixed connection. Thus, the induction heating tool 108a is only connectable to the power receptacle 202 via the power insert 204a. As shown, the induction heating coils 122 of induction heating tool 108b are in electrical communication (e.g., via adapters 124) with plugs 124 that are configured to connect to both/either power insert 204b and/or power insert 204c. In some examples, the plugs 124 may be configured to connect to a wide variety of different power inserts 204. Thus, the induction heating tool 108b is connectable to the power receptacle 202 via both/either power insert 204b and/or power insert 204c. When the power receptacle 202 is coupled to the power insert 204 of an induction heating tool 108, the modular transformer 200 is completed and the induction heating tool 108 may receive induction-type power from the induction heating power supply 102, so that the induction heating tool 108 can perform an induction heating operation.

In the example of FIG. 1, the power inserts 204 comprise second portions of the modular transformer 200. Each power insert includes a secondary winding 212 and a secondary core 213 of the modular transformer 200. The secondary winding 212 comprises one or more conductors twisted in a helix (and/or other pattern) to encircle the secondary core 213 of the power insert 204. The secondary winding 212 may be hermetically sealed within a housing of the power insert 204, so there is no exposed wiring.

In some examples, the secondary winding 212 may comprise one or more fluid cooled conductors, such as, for example, a hollow conductor (e.g., copper, aluminum, etc.) cooled by fluid routed through the hollow interior of the conductor, or a conductor within hollow tubing cooled by fluid routed over the conductor within the hollow tubing. In some examples, a cooling system (not shown) may connect to the secondary winding 212 (e.g., via the adapters 124) to introduce and/or remove cooling fluid. In some examples, such cooling may assist in mitigating heat produced by electrical current flowing through the secondary winding 212. In some examples, the cooling fluid may also be used to cool the induction heating coil 122.

Different power inserts 204 may have differently configured secondary windings 212 (e.g., with different numbers of winding turns). In the example of FIG. 1, the secondary winding 212a of the power insert 204a has the most turns of the power inserts 204, and the secondary winding 212b of the power insert 204b has the least turns of the power inserts 204, with the secondary winding 212c of the power insert 204c falling in between. As shown, the secondary winding 212c of the power insert 204c have the same number of turns as the primary winding 206 of the power receptacle 202.

Figure 2A:
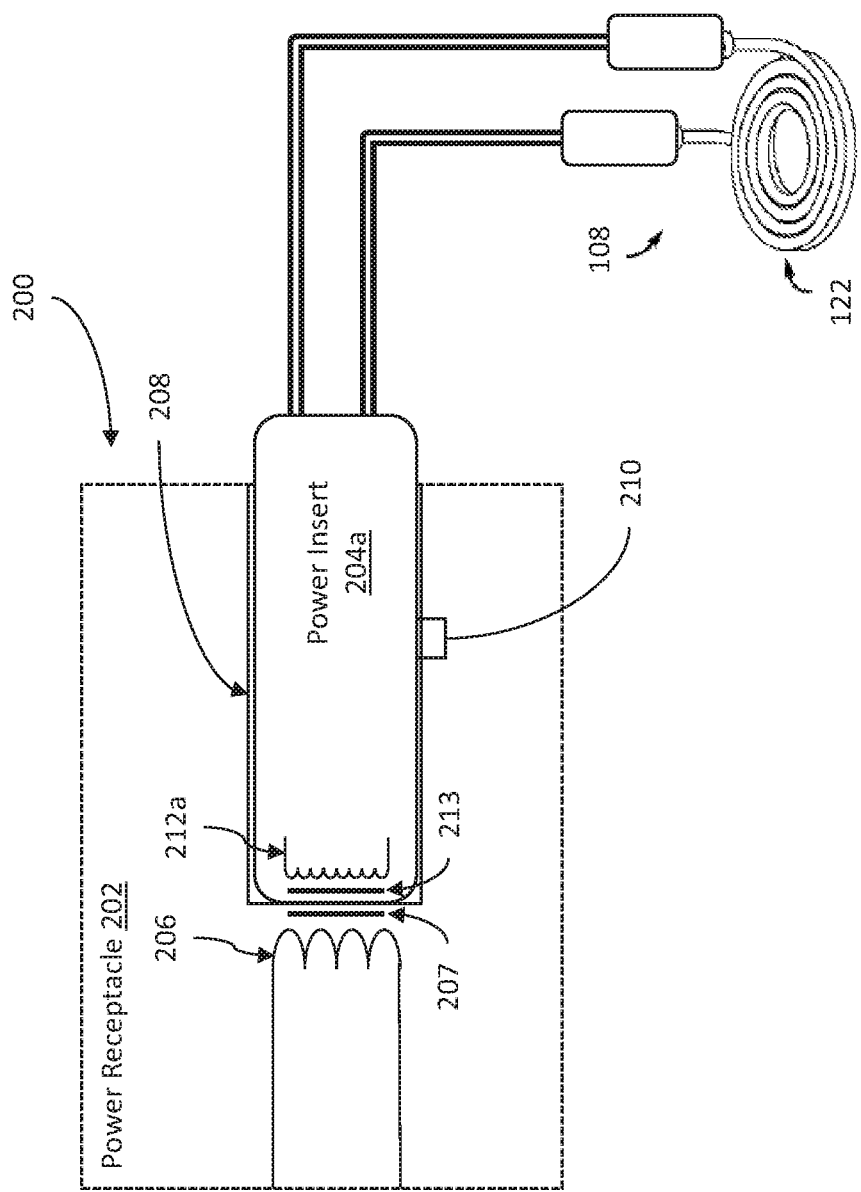
FIG. 2a is a block diagram illustrating coupling of a power receptacle and power insert of a modular transformer of the induction heating system of FIG. 1, in accordance with aspects of this disclosure.

FIG. 2a shows an example of the modular transformer 200 that is completed (and/or formed) when the power receptacle 202 is coupled to one of the power inserts 204. When the power insert 204 is securely inserted into (and/or coupled to) the power receptacle 202, the primary core 207 of the power receptacle 202 and secondary core 213 of the power insert 204 align to complete the modular transformer 200. As shown, the connection detection switch 210 is displaced by the coupling, thereby completing the connection detection circuit so as to provide a detectable indication (e.g., a signal or cessation of a signal) to the control circuitry 106 that the modular transformer 200 is completed.

Figure 2B:
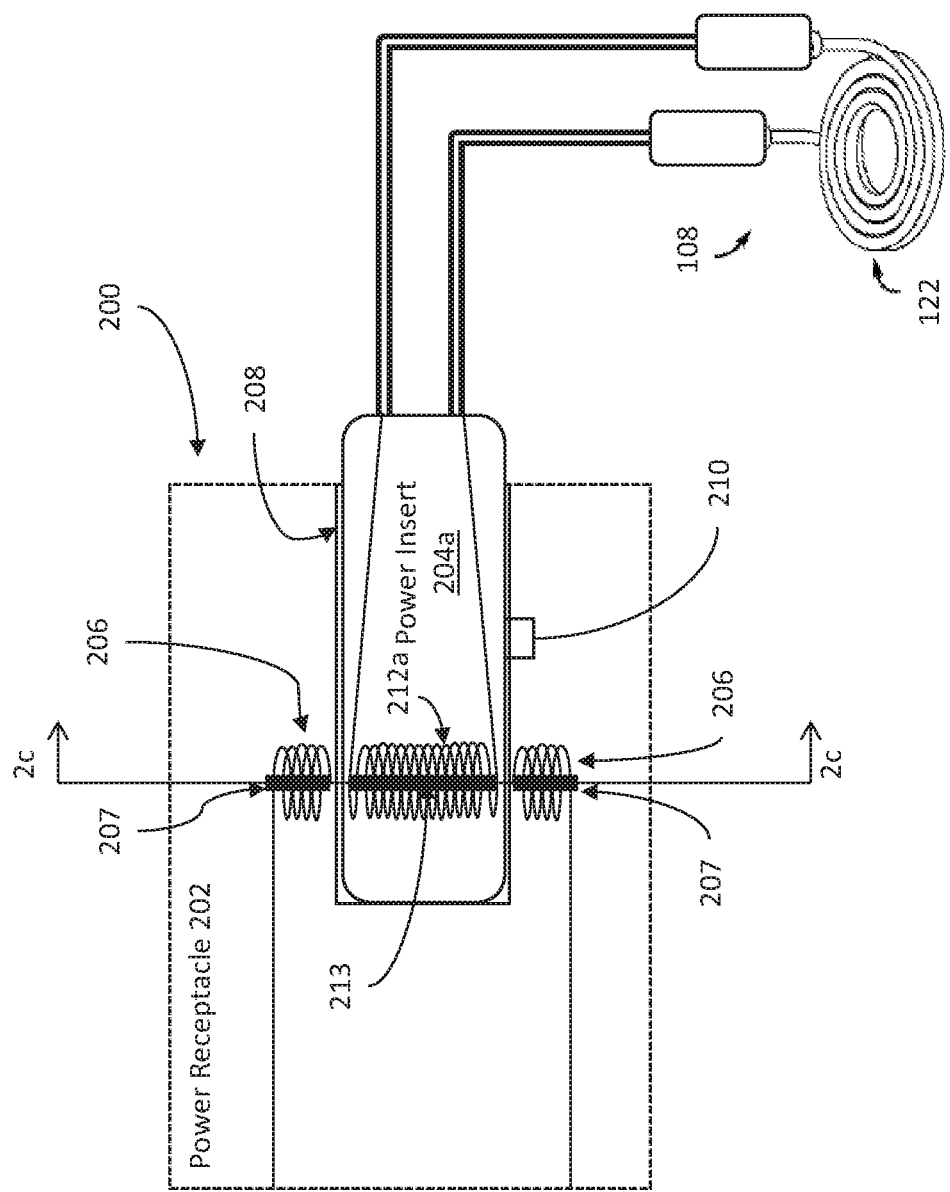
FIG. 2b is a block diagram illustrating alignment of the transformer cores and windings of the coupled power receptacle and power insert of FIG. 2a, in accordance with aspects of this disclosure.

FIG. 2b is another illustration of the completed modular transformer 200. While the cores 207, 213 and windings 206, 212 are illustrated as being adjacent one another for ease of illustration in FIGS. 1 and 2a, FIG. 2b shows a more practical implementation of the completed modular transformer 200. As shown, the ferromagnetic core of the modular transformer 200 is divided into two primary cores 207 (e.g., upper core 207a and lower core 207b) of the power receptacle 202 and one secondary core 213 of the power insert 204. The primary cores 207 are aligned on opposite sides of the opening 208 of the power receptacle 202. Primary windings 206 encircle the primary cores 207. The secondary core 213 is retained by the power insert 204, with secondary windings 212 encircling the secondary core 213. The power receptacle 202 and power insert 204 are configured such that the secondary core 213 is aligned with the primary cores 207 when the power insert 204 is fully inserted into (and/or coupled to) the power receptacle 202. In some examples, the primary winding 206 and secondary winding 212 may be concentrically aligned (e.g., with the cores 207, 213 at their respective centers) when the power insert 204 is fully inserted into (and/or coupled to) the power receptacle 202.

Figure 2C:
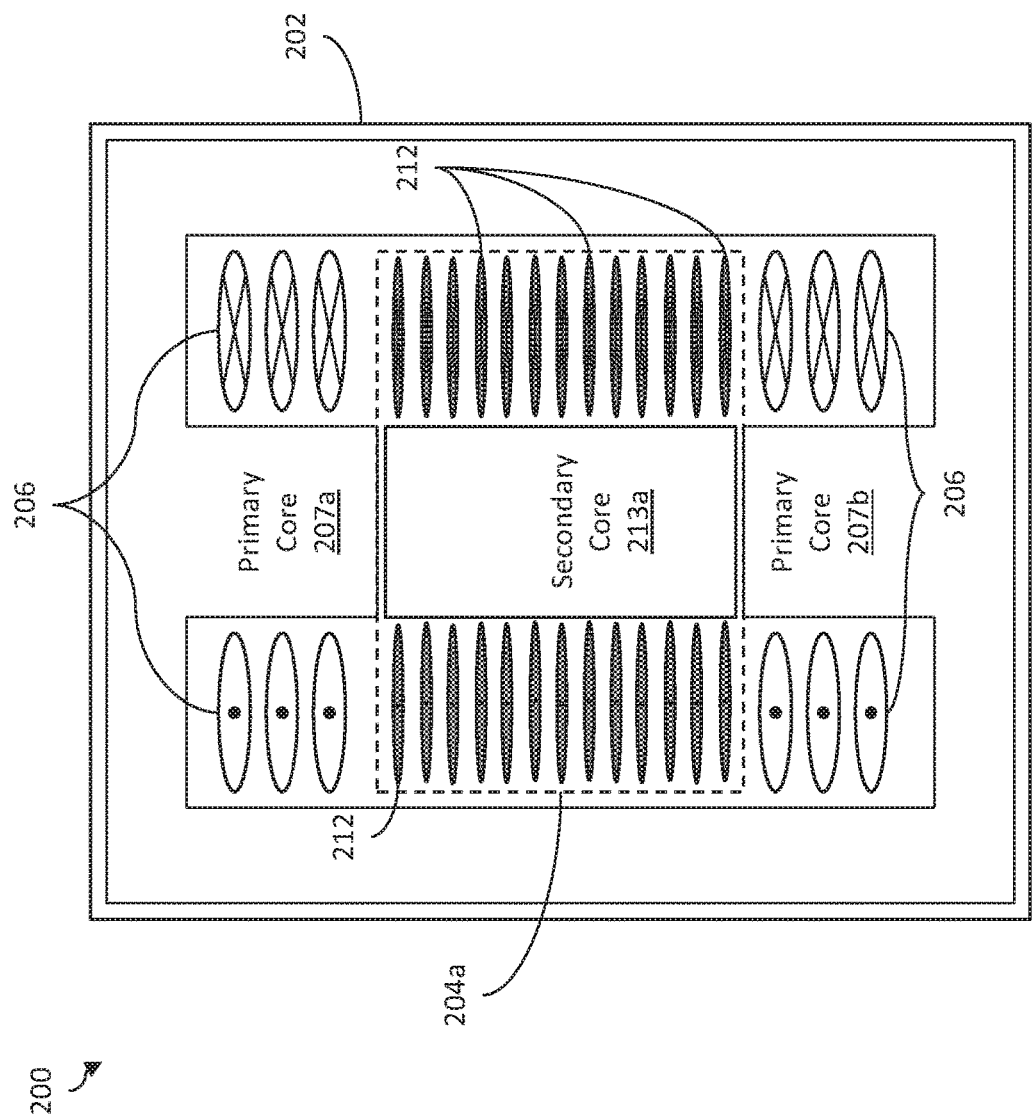
FIG. 2c is a cross-section of the connected power receptacle and power insert of FIG. 2b along the line 2c-2c in FIG. 2b, in accordance with aspects of this disclosure.

FIG. 2c shows an example cross-section of the completed modular transformer 200. While the modular transformer 200 in FIG. 2c shows the primary windings 206 and secondary windings 212 as having the same winding direction, in some examples, the primary windings 206 and secondary windings 212 may have opposite winding directions. As shown, there are approximately twice as many secondary windings 212 as primary windings 206, making the modular transformer 200 a 1:2 step up transformer. In some examples, the modular transformer 200 may be configured differently depending on the primary windings 206 and/or secondary windings 212 of the power receptacle 202 and/or power insert 204 used to complete the modular transformer 200.

In operation, an operator may use different power receptacles 202 and/or power inserts 204 (each having potentially different primary winding 206 and/or secondary winding 212 configurations) with different induction heating power supplies 102 and/or induction heating tools 108 in order to achieve the desired results. By using different power receptacles 202 and/or power inserts 204, the operator may manipulate the ratio of primary windings 206 to secondary windings 212 without having to directly access and/or manipulate the exposed wire windings of the transformer. If the ratio of primary windings 206 to secondary windings 212 is less than ideal for impedance matching and/or the desired step up/down voltage, an operator can use a different power receptacle 202 and/or power insert 204, with a different number (and/or configuration) of primary windings 206 and/or secondary windings 212, without having to directly manipulate any exposed wire windings.

While the modular transformer 200 of FIGS. 2b and 2c is depicted with two separated primary cores 207a, 207b and one secondary core 213a, in some examples, there may be only one primary core 207. For example, there may be only an upper primary core 207a or only a lower primary core 207b, with corresponding windings 206. In such an example, the primary core 207 may comprise one complete half of the core of the modular transformer 200, while the secondary core 213a may comprise the other half. Additionally, though the modular transformer 200 of FIG. 2c is shown with an E-core, in some examples, the modular transformer 200 may instead be configured with one or more other core types, such as a U-core, a P-core, a pot core, a toroid core, etc.

Figure 3:
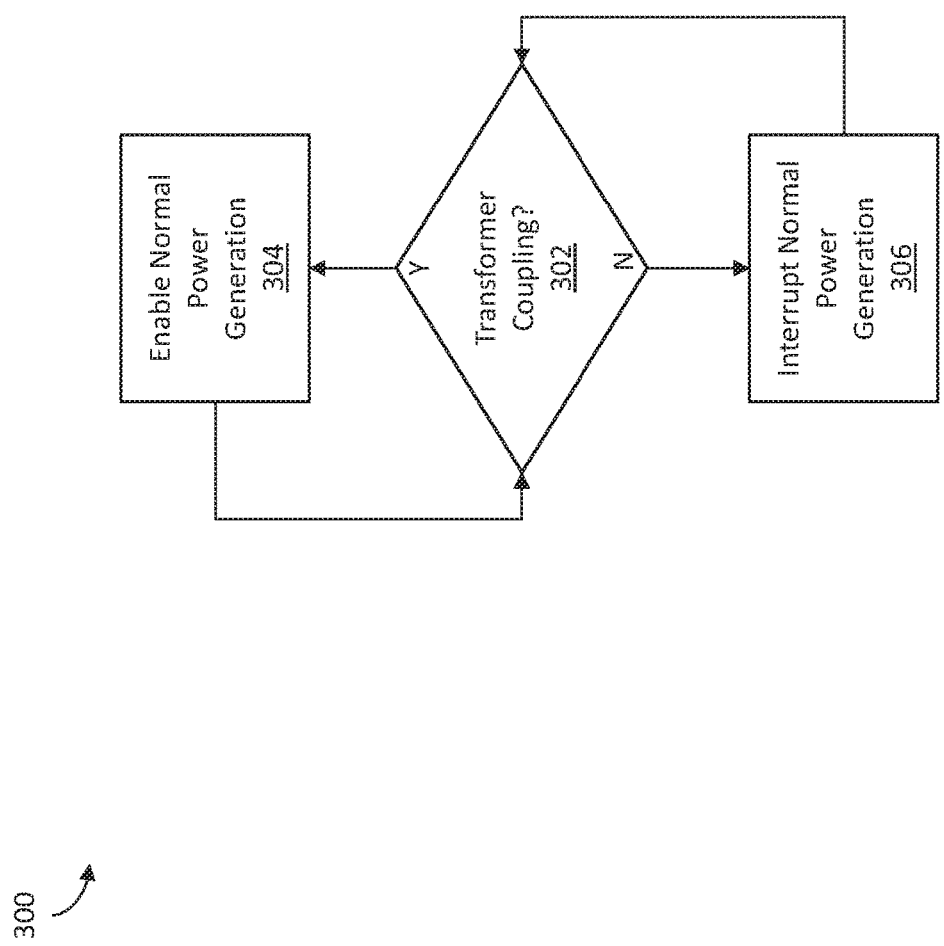
FIG. 3 is a block diagram illustrating an example coupling control process, in accordance with aspects of this disclosure.

FIG. 3 shows an example coupling control process 300 of the present disclosure. In some examples, the coupling control process 300 may be implemented via machine readable instructions, such as may be stored in memory circuitry 114 and/or executed by the one or more processors 110. In some examples, the coupling control process 300 may be implemented via discrete and/or analog circuitry of the control circuitry 106. The coupling control process 300 is configured to control the power conversion circuitry 116 based on whether the power receptacle 202 is coupled to the power insert 204. In some examples, the coupling control process 300 may be executed by one or more other control process and/or in conjunction with one or more other control processes.

In the example of FIG. 3, the coupling control process 300 is implemented as a continuously iterating and/or looping operation in block 302. At block 302, the coupling control process 300 determines whether the power receptacle 202 is coupled to the power insert 204. The coupling control process 300 may make this determination based, at least in part, on feedback received from the power conversion circuitry 116, and/or the connection detection switch 210 (and/or associated connection detection circuit), as discussed above. If the coupling control process 300 determines that the power receptacle 202 is coupled to the power insert 204, the coupling control process 300 proceeds to block 304. If the coupling control process determines that the power receptacle 202 is not coupled to the power insert 204, the coupling control process 300 proceeds to block 306. After blocks 304 and/or 306, the coupling control process returns to block 302.

If the coupling control process 300 determines that the power receptacle 202 is coupled to the power insert 204, block 304 of the coupling control process 300 executes. At block 304, the coupling control process 300 enables normal power generation of the power conversion circuitry 116 to proceed. If normal power generation had previously been interrupted (e.g., by block 306), the coupling control process 300 resumes normal power generation.

If the coupling control process determines that the power receptacle 202 is not coupled to the power insert 204, block 306 executes. At block 306, the coupling control process 300 interrupts normal power generation of the power conversion circuitry 116, so that induction-type power is not continually added to the system bus with nowhere to go. In some examples, the interruption of normal power generation may comprise disabling of the power conversion circuitry 116 (e.g., via a cessation of control signals or use of control signals configured to disable), reducing the amount of induction-type power produced by the power conversion circuitry 116 (e.g., via representative control signals), and/or other appropriate action. In some examples, the interruption of normal power generation may further comprise generating a warning (and/or alert/alarm), such as via the user interface 112 and/or some other interface (e.g., the interface of a remote device, mobile device, etc.). Afterwards, the coupling control process 300 returns to block 302.

The present methods and systems may be realized in hardware, software, and/or a combination of hardware and software. Example implementations include an application specific integrated circuit and/or a programmable control circuit.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. An induction heating system, comprising:
a primary power coupler comprising a first primary magnetic core, a second primary magnetic core, and an opening positioned between, and separating, the first primary magnetic core and the second primary magnetic core, the primary power coupler configured for electrical communication with an induction heating power supply; and
a secondary power coupler comprising a secondary magnetic core, the secondary power coupler configured for electrical communication with an induction heating tool,
wherein the primary power coupler and secondary power coupler are configured to align the first primary magnetic core and the second primary magnetic core with the secondary magnetic core when the secondary power coupler is inserted into the opening, the alignment of the first primary magnetic core, second primary magnetic core, and secondary magnetic core forming a transformer through which the induction heating power is transferred to the induction heating tool.

2. The system of claim 1, wherein the primary power coupler further comprises a coupling detector configured to detect whether the primary power coupler and the secondary power coupler are magnetically coupled.

3. The system of claim 1, wherein the primary power coupler is configured for releasable attachment to the induction heating power supply, and the secondary power coupler comprises a connector configured for releasable attachment to a complementary connector of the induction heating tool.

4. The system of claim 1, wherein the primary power coupler further comprises a first primary winding wound around the first primary magnetic core and a second primary winding wound around the second primary magnetic core, and the secondary power coupler further comprises a secondary winding wound around the secondary magnetic core.

5. The system of claim 4, wherein the first primary winding and second primary winding are hermetically sealed within a primary housing that retains the first primary magnetic core and the second primary magnetic core, the secondary winding is hermetically sealed within a secondary housing that retains the secondary magnetic core, and the primary and secondary housings are configured to align the first primary magnetic core, second primary magnetic core, and secondary magnetic core when the primary and secondary power couplers are connected together.

6. The system of claim 4, wherein the first primary winding, second primary winding, or secondary winding comprises a hollow conductor configured to receive a coolant fluid.

7. The system of claim 2, wherein the induction heating power supply is configured to disable in response to the coupling detector detecting that the primary power coupler and secondary power coupler are decoupled.

8. The system of claim 1, further comprising control circuitry configured to detect when the primary power coupler and secondary power coupler are decoupled, wherein the control circuitry is configured to disable the induction heating power supply in response to the detection.

9. A method of impedance matching an induction heating power supply, comprising:
  decoupling a first power coupler in electrical communication with an induction heating power supply from a second power coupler in electrical communication with an induction heating tool, the first power coupler comprising a first magnetic core and a first conductor wound around the first magnetic core with a first number of turns, and the second power coupler comprising a second magnetic core and a second conductor wound around the second magnetic core with a second number of turns,
  wherein the first power coupler and second power coupler are configured to magnetically couple the first magnetic core and the second magnetic core to form a transformer through which induction heating power is transferred from the induction power supply to the induction heating tool; and
  coupling the first power coupler to a third power coupler in electrical communication with the induction heating tool or an alternate induction heating tool, the third power coupler comprising a third magnetic core and a third conductor wound around the third magnetic core with a third number of turns, wherein the third number of turns of the third power coupler is different than the second number of turns of the second power coupler,
  wherein the first power coupler and third power coupler are configured to magnetically couple the first magnetic core and the third magnetic core to form a transformer through which the induction heating power is transferred to the induction heating tool or the alternate induction heating tool.

10. The method of claim 9, wherein the first conductor, second conductor, or third conductor comprises a hollow conductor configured to receive a coolant fluid.

11. The method of claim 10, further comprising decoupling the second power coupler from the induction heating tool such that the second power coupler is no longer in electrical communication with the induction heating tool, and coupling the third power coupler to the induction heating tool such that the third power coupler is in electrical communication with the induction heating tool.

12. The method of claim 11, wherein the second power coupler is decoupled from the induction heating tool via a second connector of the second power coupler and a complementary connector of the induction heating tool, and the third power coupler is coupled to the induction heating tool via a third connector of the third power coupler and the complementary connector of the induction heating tool.

13. The method of claim 9, wherein the first conductor is hermetically sealed within a first housing that retains the first magnetic core, the second conductor is hermetically sealed within a second housing that retains the second magnetic core, the third conductor is hermetically sealed within a third housing that retains the third magnetic core, the first and second housings are configured to align the first core with the second core when the first and second power couplers are connected together, and the first and third housings are configured to align the first core with the third core when the first and third power couplers are connected together.

14. The method of claim 9, further comprising:
  disabling the induction heating power supply in response to detecting the decoupling of the first power coupler from the second power coupler; and
  enabling the induction heating power supply in response to detecting the coupling of the first power coupler to the third power.

15. An induction heating power supply, comprising:
  power conversion circuitry configured to receive input power from a power source and convert the input power to induction heating power; and
  a primary power coupler in electrical communication with the power conversion circuitry, the primary power coupler comprising a first primary magnetic core, a second primary magnetic core, and a receptacle positioned between, and separating, the first primary magnetic core and the second primary magnetic core, the receptacle configured to receive a secondary power coupler comprising a secondary magnetic core, the secondary power coupler being in electrical communication with an induction heating tool,
  wherein the primary power coupler and secondary power coupler are configured to align the first primary magnetic core and the second primary magnetic core with the secondary magnetic core when the secondary power coupler is received in the receptacle, the alignment of the first primary magnetic core, second primary magnetic core, and secondary magnetic core forming a transformer through which the induction heating power is transferred to the induction heating tool.

16. The power supply of claim 15, wherein the primary power coupler is releasably attached to the induction heating power supply.

17. The power supply of claim 15, wherein the primary power coupler further comprises a first primary winding wound around the first primary magnetic core and a second primary winding wound around the second primary magnetic core, the first primary winding and the second primary winding being hermetically sealed within a primary housing that retains the first primary magnetic core.

18. The power supply of claim 15, further comprising control circuitry configured to disable the power conversion circuitry in response to a signal representative of decoupled primary and secondary power couplers.

19. The power supply of claim 18, wherein the signal comprises a feedback signal received from the power conversion circuitry.

20. The power supply of claim 18, wherein the primary power coupler further comprises a coupling detector configured to detect whether the secondary power coupler has been received within the receptacle of the primary power coupler, the coupling detector being further configured to send the signal to the control circuitry based on the detection, the control circuitry being configured to disable the power conversion circuitry in response to the signal being representative of the secondary power coupler not being received within the receptacle.

* * * * *